United States Patent Office 3,348,926
Patented Oct. 24, 1967

3,348,926
STABLE PHOSPHONITRILIC POLYMERS
Erik R. Nielsen, Des Plaines, and William L. Stepp, Chicago, Ill., assignors to IIT Research Institute, a corporation of Illinois
No Drawing. Filed Aug. 3, 1961, Ser. No. 130,227
4 Claims. (Cl. 23—357)

The present invention relates to phosphonitrilic polymers and more particularly to such polymers of this class which are stable at comparatively elevated temperatures. In addition to such heat stability, the present polymers are further characterized by hydrolytic stability, this in marked contrast to the somewhat similar compounds of the prior art.

With the advance of technology and regular trend toward operations at elevated temperatures, there has arisen the need for high-temperature stable plastic and elastomeric materials to fill a property gap between the fluorine containing polymers, e.g., "Teflon" on one hand and the ceramic materials on the other. The inorganic polymers comprising the subject matter of the present invention, as far as we can determine, are the first to fill this need, and, as such find utility for a multitude of purposes wherein resistance to high temperature breakdown is a desirable feature.

The starting materials for the present new polymers are the well-known phosphonitrilic chloride polymers. While, as is known to those skilled in this particular art, such polymers have high-temperature stability, they suffer the shortcomings of disintegrating in the presence of moisture and, therefore, are not useful. In view of such desirable temperature feature there has been considerable research effort directed to the hydrolytic stabilization of such materials, but until the inception of the present invention all such attempts have terminated in failure.

The present invention is based upon our discovery that certain phosphonitrilic chlorides readily react with a number of specific compounds to form an interesting and useful group of polymers which are characterized by both high temperature and hydrolytic stability. More specifically, we have found that by treating relatively low polymeric phosphonitrilic chlorides with compounds such as certain cyanides, azides and others that these desirable features may readily result. How this is accomplished is set out in considerable detail below.

Accordingly, a primary object of our invention is to provide a new class of high-temperature-stable inorganic polymers and a method whereby such polymers may be readily produced.

Another object of our invention is to provide a new group of phosphonitrilic cyanide polymers.

These and other objects, features and advantages of our invention will become apparent to those skilled in this particular art from the following detailed disclosure thereof.

Phosphonitrilic chlorides are characterized by the formula $(PNCl_2)_n$ where $n$ has a value ranging from 3 to 11. Such polymers are classically produced by the ammonalysis of phosphorus pentachloride in accord with the following reaction:

$$PCl_5 + NH_4Cl \xrightarrow[\text{(heat)}]{} (PNCl_2)_n + 4HCl$$

Normally in such reaction the trimer and tetramer fractions comprise about 50% of the resulting materials and the remainder consists of the 5 to 11 unit polymers. It is such latter fraction which is employed as the starting material in our process.

The structure of the phosphonitrilic chloride polymers of the 5 to 11 unit variety is not fully understood, but the best evidence currently points to a skeletal system as follows:

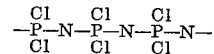

As one would expect, such polymers have high temperature stability; unfortunately, as noted above, they disintegrate in the presence of moisture, apparently through the mechanism of hydrogen chloride formation, and thus such materials have proven substantially useless for polymeric purposes. Obviously, in almost every instance, at one time or another such materials will be subject to moisture in the air or otherwise.

In distinction to this, we have discovered that such 5 to 11 unit polymers are readily stabilized against moisture attack upon the substitution of the chlorine atoms with —CN groups or a combination of such —CN groups along with secondary groups such as —NH₂. For some unexpected reason, in addition to the chlorine substitution that occurs, there also results a continued polymerization of the phosphonitrilic skeletons to yield stabilized polymers ranging from brittle plastics to elastomer-like polymers which do not melt or decompose at 300° C. Additional polymerization under the conditions of our invention further elevates this decomposition temperature.

In its most essential features, therefore, our invention is directed first to the concurrent cyanolation and further polymerization of certain selected phosphonitrilic chloride polymers to form phosphonitrilic cyanide polymers. In view of the starting materials that are employed, such phosphonitrilic polymers will consist of at least 5 phosphonitrilic units; the maximum number of such units, on the other hand, runs into the hundreds. Thus, the molecular weights of the present polymers range from about 500 to many thousand.

Another aspect of our invention involves the subsequent amidization of the cyanolated phosphonitrilic polymers. This is performed to even better insure the hydrolytic stability of the final polymers.

Still a third aspect of our invention is concerned with the azidization of the cyanolated product by the treatment thereof with materials such as sodium azide, NaN₃.

Our process may be best understood by reference to the following examples: in all such cases it should be borne in mind when the term phosphonitrilic chloride polymer is employed is meant that fraction having the formula $(PNCl_2)_{5-11}$—the so-called "5 to 11" fraction that is mentioned above.

*Example I*

A solution of phosphonitrilic chloride polymer in carrier tetrahydrofuran (19.5 grams of polymer in 400 ml. of tetrahydrofuran) was ball milled with 25 grams of substantially anhydrous potassium cyanide for 72 hours to exchange cyanide groups for the chlorine atoms. At the same time that such chlorine substitution is taking place, further polymerization and chain lengthening likewise occur to result in the formation of a high molecular weight phosphonitrilic cyanide polymer. Following this, at the termination of the reaction the solution is filtered off and the remaining polymer is further separated therefrom by evaporation of the carrier liquid.

*Example II*

In such example the terahydrofuran carrier of Example I was replaced by 400 ml. of acetone. In all other aspects the procedure was the same as that set forth in the previous example.

It should be noted at this point that a wide variety of liquid carriers may be employed in lieu of the tetrahydrofuran or acetone noted above. Essentially, all that is required of them is that they be capable of suspending the $(PNCl_2)_{5-11}$ and not react with any of the reactants or reaction products of the polymerization process.

The reaction may also be carried out in the absence of a carrier—that is, the (phosphonitrilic chloride)$_{5-11}$ can be directly milled with the cyanolating agent.

We have found that complete substitution of the chlorine is difficult to achieve in the cyanation process, but for some purposes such completeness is unnecessary. For example, if 95% of the chlorine atoms are substituted, the resulting polymer will have fairly good, but not perfect, hydrolytic stability. When complete removal of the chlorine is necessary, however, the cyanation reaction is followed by a fast, vigorous reaction to completely clear the chlorine atoms from the system. One such reaction is with inorganic amides and more particularly, either potassium amide, $KNH_2$ or sodium amide, $NaNH_2$. This reaction may be clearly seen from the following example:

*Example III*

3.5 grams of the polymer resulting from Example I with carrier liquid still present was added to 0.3 gram of potassium amide in liquid ammonia. The resulting polymer consisting essentially of polymeric phosphonitrilic cyanide with small amounts of phosphonitrilic amide not only illustrates good temperature stability, but likewise are extremely resistant to hydrolytic decay.

It will be understood that various modifications and variations may be effected without departing from the spirit or scope of the novel concepts of our invention.

We claim as our invention:

1. A water stable polymeric compound having a molecular weight of greater than 500 comprising the reaction product of $(PNCl_2)_{5-11}$ with an alkali metal cyanide, said reaction product being produced in a water-free environment.

2. The polymeric compound as defined in claim 1 wherein said alkali metal cyanide is potassium cyanide.

3. A water stable polymeric compound having a molecular weight of greater than 500 comprising the end reaction product of first reacting $(PNCl_2)_{5-11}$ with an alkali metal cyanide in a water-free environment to produce a first reaction product and then reacting said first reaction product with a compound selected from the group consisting of alkali metal amides and alkali metal azides.

4. The polymeric compound as defined in claim 3 wherein said alkali metal cyanide is potassium cyanide and said alkali metal amide and azide is selected from the group consisting of potassium amide, sodium amide and sodium azide.

References Cited

UNITED STATES PATENTS 3,044,846   7/1962   Audrieth et al. _____ 23—14

OTHER REFERENCES

Moeller: "Inorganic Chemistry," 1952, pp. 463–466.

Otto et al.: "Journal of The American Chemical Society," vol. 82, pp. 528–530 (1960).

Shaw et al.: "Chemical Reviews," vol. 62, p. 255 (1962).

MILTON WEISSMAN, *Primary Examiner.*

MAURICE BRINDISI, *Examiner.*

M. N. MELLER, *Assistant Examiner.*